United States Patent [19]

Kajimoto

[11] Patent Number: 4,872,119

[45] Date of Patent: Oct. 3, 1989

[54] ELECTRONIC POSTAL SCALE FOR COMPUTING A POSTAL CHARGE

[75] Inventor: Hironobu Kajimoto, Tokyo, Japan

[73] Assignee: Teraoka Seiko Co., Ltd., Japan

[21] Appl. No.: 40,349

[22] Filed: Apr. 20, 1987

[30] Foreign Application Priority Data

Apr. 28, 1986 [JP] Japan .................................. 61-98643
Jun. 30, 1986 [JP] Japan ................................. 61-153318

[51] Int. Cl.⁴ ........................ G06F 15/20; G07B 17/02
[52] U.S. Cl. .............................. 364/464.03; 177/25.15
[58] Field of Search ................................. 177/3, 25.15;
364/464.02, 464.03, 466, 567

[56] References Cited

U.S. PATENT DOCUMENTS

| | | | |
|---|---|---|---|
| 3,951,221 | 4/1976 | Rock | 177/1 |
| 4,495,581 | 1/1985 | Piccione | 364/567 X |
| 4,499,545 | 2/1985 | Daniels et al. | 177/25.15 X |
| 4,504,915 | 3/1985 | Daniels et al. | 364/466 |
| 4,535,419 | 8/1985 | Dlugos et al. | 364/464 X |
| 4,598,780 | 7/1986 | Iwasaki et al. | 177/3 |
| 4,660,160 | 4/1987 | Tajima et al. | 364/567 |

Primary Examiner—Parshotam S. Lall
Assistant Examiner—Edward R. Cosimano
Attorney, Agent, or Firm—Darby & Darby

[57] ABSTRACT

An electronic postal scale for computing a postal charge in correspondence with complicated rates and additional services is disclosed. The electronic postal scale is basically constituted by a scale portion, an operating portion provided with preset keys, a first memory, a second memory, a third memory, and a control portion having reloading function. The scale portion measures a weight of a package so as to obtain weight data. The preset keys are used for reading out charge information concerning the package such as postal rates corresponding to destinations, service charges corresponding to postal kinds and other required information. Look up numbers are assigned corresponding to the preset keys. The first memory stores the charge information, and the second memory stores relations between the charge information and the look up numbers, and the third memory stores relations between the look up numbers and the preset keys. The reloading function changes contents of data stored in the second and third memory based on an operation of the operating portion. Furthermore, the control portion reads out the desirable charge information assigned to depressed preset key so as to calculate the postal charge of the package based on the weight data and the desirable charge information.

16 Claims, 17 Drawing Sheets

CHARGE TBL #15

CHARGE TABLE 22

| W (lb.) | ZONE | | | | | | |
|---|---|---|---|---|---|---|---|
| | 2 | 3 | 4 | 5 | 6 | 7 | 8 |
| 1 | 1.23 | 1.32 | 1.46 | 1.52 | 1.59 | 1.67 | 1.74 |
| 2 | 1.24 | 1.34 | 1.63 | 1.73 | 1.87 | 2.01 | 2.16 |
| --- | --- | --- | --- | --- | --- | --- | --- |
| 46 | 4.87 | 6.93 | 9.02 | 11.15 | 14.10 | 17.19 | 20.46 |
| 47 | 4.95 | 7.06 | 9.19 | 11.36 | 14.38 | 17.54 | 20.88 |
| 48 | 5.03 | 7.18 | 9.36 | 11.58 | 14.66 | 17.88 | 21.29 |
| 49 | 5.12 | 7.31 | 9.53 | 11.79 | 14.94 | 18.23 | 21.71 |
| 50 | 5.20 | 7.43 | 9.69 | 12.00 | 15.21 | 18.57 | 22.12 |
| --- | --- | --- | --- | --- | --- | --- | --- |
| 69 | 5.59 | 8.03 | 10.52 | 13.04 | 16.53 | 20.28 | 24.09 |
| 70 | 5.61 | 8.06 | 10.56 | 13.09 | 16.59 | 20.37 | 24.19 |

(B)

CHARGE TABLE 22

| CHARGE TBL #51 | | | |
|---|---|---|---|
| #60 | UPS COD | 1.90 | |
| #61 | UPS AOD | 0.30 | |
| #n | | | |

FIG.10

(A)
```
         41; RATE              44; DATE
                               45; SERIAL
                                   NUMBER
     ┌─────────────────────┐ 1/3
     │ UPS   GROUND   86.5.1 │
     │                       │──46; WEIGHT
     │            48LB  15OZ │
     │                       │──40
     │ KS - 69914      ZN 4  │──47; ZONE
     │ PKG ID#1267   $ 9.53  │──48; RATE
     │                       │       CHARGE
     │            ($ 11.73)  │
     └─────────────────────┘──49; TOTAL
       42; PUBLISHING  43; PACKAGE NO.  CHARGE
           OFFICE
```

(B)
```
        41a; SERVICE
     ┌─────────────────────┐ 2/3
     │ UPS   COD     86.5.1 │
     │            48LB  15OZ │
     │ KS - 69914      ZN 4  │──40
     │ PKG ID#1267   $ 1.90  │
     │            ($ 11.73)  │
     └─────────────────────┘──48a; SERVICE
                                   CHARGE
```

(C)
```
        41b; SERVICE
     ┌─────────────────────┐ 3/3
     │ UPS   AOD     86.5.1 │
     │            48LB  15OZ │
     │ KS - 69914      ZN 4  │──40
     │ PKG ID#1267   $ 0.30  │
     │            ($ 11.73)  │
     └─────────────────────┘──48b; SERVICE
                                   CHARGE
```

52; PUBLISHING OFFICE
51; RATE
54; DATE
55; WEIGHT
56; ZONE
57; POSTAL CHARGE
53; PACKAGE NUMBER

UPS GROUND INTER   86.8.3
KS-699184   7LB   9.05Z
          ZIP123 ZHO   $1.73
PKG ID #AB 222

(B)

UPS GROUND INTER   86.8.3
              7LB   9.05Z
T E S T   ZIP111 ZHO
                    $1.73
PKG ID #AB 222

```
HMUUNT         3U.3U

UPS NEXT DAY AIR
TRAN NO. 29
PIN NO. AB 222
DPT NO. 112
WEIGHT         18.12.0
AMOUNT         33.00

UPS NEXT DAY LETTER
TRAN NO. 30
PIN NO. RB 222
DPT NO. 112
WEIGHT         18.12.0
AMOUNT         8.50

UPS NEXT DAY LETTER
TRAN NO. 31
PIN NO. AB 222
DPT NO. 112
WEIGHT         18.12.0
AMOUNT         8.50

UPS NEXT DAY LETTER
TRAN NO. 32
PIN NO. AB 222
DPT NO. 112
WEIGHT         23.02.5
AMOUNT         8.50

UPS NEXT DAY LETTER
TRAN NO. 33
PIN NO. AB 222
DPT NO. 112
WEIGHT         23.02.5
AMOUNT         8.50

UPS 2ND DAY AIR
TRAN NO. 34
PIN NO. AB 222
DPT NO. 112
WEIGHT         18.12.0
AMOUNT         22.50

UPS 2ND DAY AIR
TRAN NO. 35
PIN NO. AB 222
DPT NO. 112
WEIGHT         18.12.0
AMOUNT         25.77
```

(B)

```
RESOURCE  # 01
UPS INTER

RESOURCE  # 02
UPS INTRA

RESOURCE  # 03
UPS NEXT DAY AIR

RESOURCE  # 04
UPS NEXT DAY LETTER

RESOURCE  # 05
UPS 2ND DAY AIR

RESOURCE  # 06
UPS EUROPE AIR

RESOURCE  # 07
USPS PRESORT 1ST

RESOURCE  # 08
USPS 1ST / PM

RESOURCE  # 09
USPS 3RD / PP

RESOURCE  # 10
USTS BOOK

RESOURCE  # 11
USPS CATALOG

RESOURCE  # 12
USPS LIBRARY
```

ELECTRONIC POSTAL SCALE FOR COMPUTING A POSTAL CHARGE

BACKGROUND OF THE INVENTION

1. Field of the Invention

The present invention relates generally to electronic postal scales, and more particularly to an electronic postal scale for computing a postal charge in which a postal charge of a package is automatically calculated based on a weight, a destination, a postal type, a postal rate and the like.

2. Prior Art

The postal charge differs based on a postal type, a destination, a weight, a postal rate, a type of a required postal service etc. of the package. Conventionally, electronic postal scales are applied for rapidly calculating the postal charge and for efficiently completing a postal business at counter. For instance, U.S. Pat. No. 3,951,221 disclosed a computing postal scale comprised of a scale portion for measuring the weight of the package, a memory portion for storing a charge information such as postal rates and postal services therein and an operating portion for depressing keys to select desirable charge information when measuring the weight of the package. The postal charge is calculated by use of the measured weight of the package and the selected charge information.

In the present specification, "package (postal package)" and "postal charge" don't mean those delivered by a communication enterprise of a government only. But the package and the postal charge respectively include a parcel delivered by a private postal company and a delivering charge of the private postal company.

In case of U.S.A., several postal companies such as the UPS (United Parcel Service), the USPS (United States Postal Service) and the FED (Federal Express) perform postal business with independent rates and independent additional services thereby. In addition, the rates are different between a domestic postal service and a foreign postal service even in the same postal company. Furthermore, the rates are subdivided into a complicated classification based on the postal type of the package (an ordinary mail, an express delivery mail or a registered mail), a type of the package (a magazine or a parcel) and a form of the package (a fixed form or an unfixed form).

In addition, the postal charge also differs by the weight of the package, the destination and an additional service (add on service). In case of the UPS, for example, extra charges are added to the amount of the postal charge by the additional services such as a COD (Collect On Delivery), an AOD (Acknowledgment Of Delivery), an AC (Address Correction), a DV (Declared Value) and the like.

Hence, it can be considered that electronic postal scale can be produced in correspondence with each postal rate, however, the kinds of the electronic postal scale must be increased and much time will be wasted in aspects of a production and a management.

Thus, an all-in-one system of the electronic postal scale can be considered as a system for storing all rates of postal companies so that the electronic postal scale can be used regardless of rates. However, following disadvantages will be occurred in this case.

(1) The operating portion includes many keys each of which corresponds to one rate or one service, however, the number of the keys becomes increasing because many rates and services must be involved. Hence, the size of the operating portion becomes large and the system thereof becomes complicated so that the operation becomes extremely difficult and many operation errors must be occurred.

(2) In order to avoid the above disadvantage, a double function constitution can be employed. In this case, one key corresponds to two and more rates or services, hence, the number of the keys is reduced. However, the operation becomes further worse than the above case.

On the other hand, the conventional electronic postal scale can only calculate and display the amount of the postal charge with regard to the measured weight of the package, the required rate, the required service, the delivering destination and the others.

Therefore, independent printers separated from the body of the electronic postal scale must be required to print the calculated postal charge on a certificate stamp or a label. The printers comprise of two independent printers such as a journal printer and a printer for printing the certificate stamp and the label. The journal printer prints data of the published certificate stamp and label on a continuous sheet (hereinafter, a continuous sheet will be referred to as a receipt sheet, for convenience' sake). Hence, the conventional electronic postal scale suffers a problem in that the price thereof becomes very high and the location area thereof becomes large.

SUMMARY OF THE INVENTION

It is therefore a general object of the invention to provide an electronic postal scale in which the postal charge can be smoothly calculated in response to the weight of the package and in response to the desired rate and the desired additional service within the complicated rates and the complicated additional services as well.

It is another object of the invention to provide an electronic postal scale in which the number of the keys in the operating portion can be reduced.

It is a further object of the invention to provide an electronic postal scale in which the postal information such as the destination, the postal type, the rate and the additional service can be selected and the data of the postal information can be newly set and changed by using the keys.

It is still another object of the invention to provide an electronic postal scale which is constituted as the all-in-one system having functions for calculating the postal charge and for printing the postal charge.

It is a still further object of the invention to provide an electronic postal scale in which the size thereof is relatively small and the price thereof is reasonable.

Other objects and advantages of this invention will be made apparent as the description progresses.

According to one aspect of the present invention, there is provided an electronic postal scale for computing a postal charge comprising: (a) scale means for measuring a weight of a package; (b) operating means provided with a plurality of keys including preset keys therein and for inputting a plurality of data concerning the postal charge and command signals, the preset keys being assigned corresponding to look up numbers; (c) first memory means for storing charge information concerning the postal charge; (d) second memory means for storing relations between the look up numbers and the charge information; (e) third memory means for storing relations between the look up numbers and the preset keys; and (f) control means provided with reloading means therein, the reloading means reloading memory contents of data stored in the second and third memory means in accordance with an operation of the operating means, the control means reading out desirable charge information assigned to depressed preset keys based on the memory contents of data stored in the second and third memory means, and the postal charge of the package being calculated based on the weight of the package and the desirable charge information.

BRIEF DESCRIPTION OF THE DRAWINGS

The invention is illustrated diagrammatically in the following drawings wherein:

FIG. 5 is a drawing showing a constitution of a charge table 22;

FIG. 10 shows front views of examples of printed label;

FIG. 25(A) is a plan view showing an example of a label printed by a registration operation and FIG. 25(B) is a plan view showing an example of a label printed by a test label printing operation; and FIG. 26(A) is a plan view of a receipt sheet printed in a report mode and FIG. 26(B) is a plan view of a receipt sheet printed in a list mode.

DESCRIPTION OF THE PREFERRED EMBODIMENTS OF THE INVENTION

Figure 1:
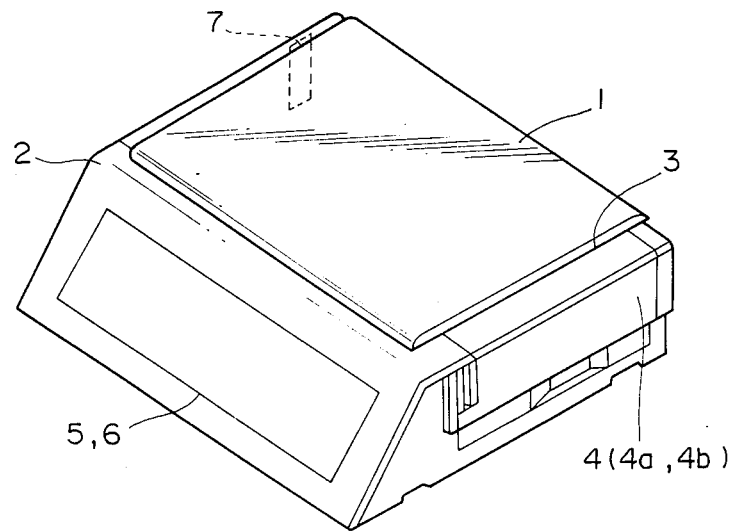
FIG. 1 is a diagrammatic perspective side view of an embodiment of the invention.

The present invention will be made based on the following view points.

(1) There are many kinds of rates and services, however, it is rare that one user of the electronic postal scale has dealings with a plurality of postal companies. Hence, the user practically uses only a few rates and services within the rates and services stored in the electronic postal scale.

(2) In one postal company, the rates and services frequently utilized differ by each user and by each branch office.

(3) Therefore, the preset keys can be efficiently utilized by assigning the practical rates and services into the preset keys in an order corresponding to a frequency in use of the rates and services.

Referring now to the drawings wherein like reference characters designate corresponding parts throughout the several views.

Figure 2:
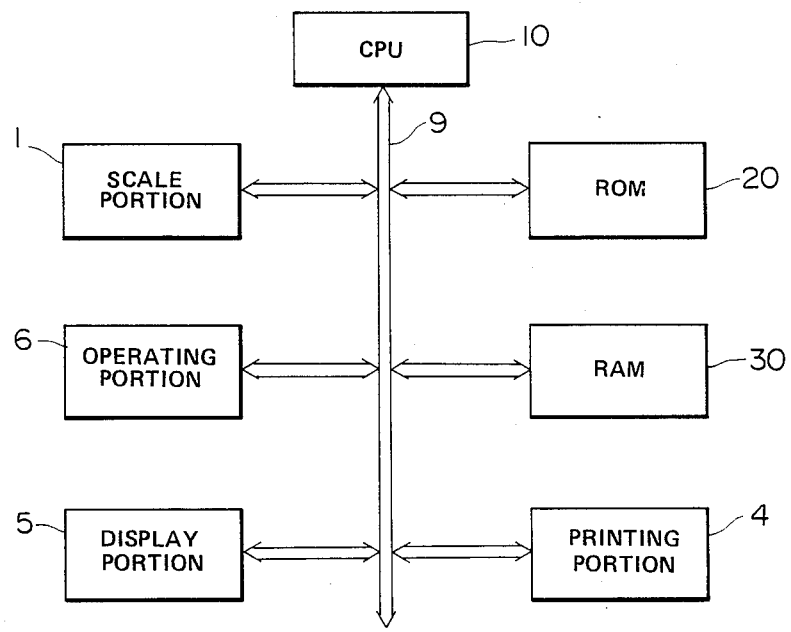
FIG. 2 is a block diagram showing an electrical constitution of a first embodiment of the invention.

FIG. 1 is a diagrammatic perspective view of an embodiment of the electronic postal scale according to the invention, and FIG. 2 is a block diagram showing an electric constitution thereof.

In FIG. 1, a scale portion 1 is constituted by a plate-shape scale pan, a load cell, an A/D converter (an analog-to-digital converter) and interface circuits, and the scale portion 1 supplies a weight signal corresponding to the weight of the package to a body 2 of the electronic postal scale. This body 2 provides a printing portion 4, a display portion 5 and an operating portion 6. The printing portion 4 prints the postal charge and other data on the labels adhered to a band-shape mount or on the rolled receipt sheet. The display portion 5 comprises of a dot indicator and the like, and the operating portion 6 comprises of a flat keyboard and the like. The printing portion 4 performs a dot type printing by use of a thermal head, and the printing portion 4 is constituted so as to change the attached cassette thereto and so as to use one of a first cassette for the labels and a second cassette for a receipt sheet selectively. One example of detailed constitution of the printing portion 4 has been disclosed in U.S. Pat. No. 4,598,780. The name of the postal company, the rate, the date, the weight of the package, the zip code and/or the zone number, the postal charge, the publication symbol, the discrimination symbol and others will be printed on the label (as shown in FIG. 10). On the other hand, the specified content of the processing data, several kinds of reports, the inspection of preset data, kinds of stored rate, the inspection and other data will be printed on the receipt sheet.

Figure 3:
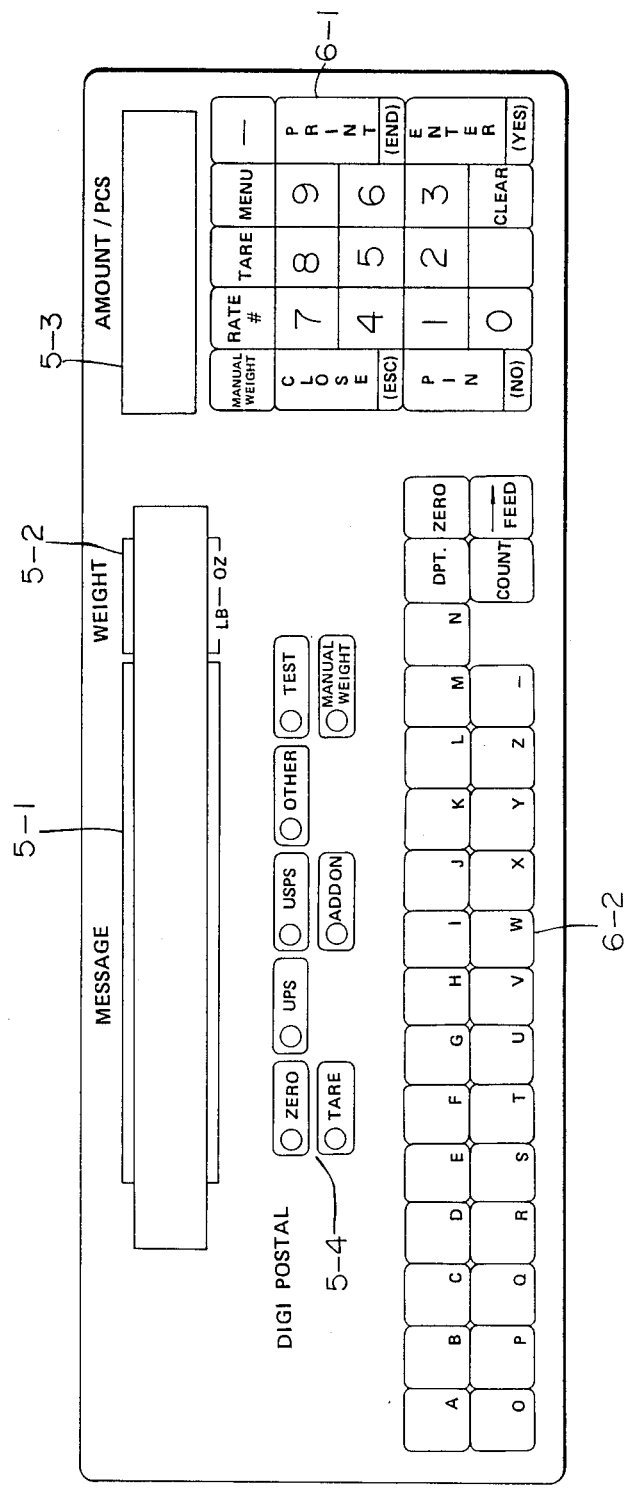
FIG. 3 is a front view of an embodiment of the invention showing an operating portion and a display portion thereof.

FIG. 3 is a plan view showing a detailed appearance of the display portion 5 and the operating portion 6.

The display portion 5 comprises a message area 5-1 for displaying messages, a weight display area 5-2 for displaying the weight of the package, a charge display area 5-3 for displaying the postal charge and a display area 5-4 for a bit-display of operating condition of the electronic postal scale and the name of the postal company corresponding to the rate presently used for calculating the postal charge. The display areas 5-1 and 5-2 are both constituted by the same liquid crystal dot display wherein numerals, characters and symbols can be arbitrarily displayed thereon. The display area 5-3 is constituted by a seven segment indicator and the display area 5-4 is constituted by light emitting diodes.

The operating portion 6 is constituted by a flat keyboard 6-1 comprising of a ten-key and function keys and by a preset keys 6-2 for selecting the rate and the service. This preset keys 6-2 comprises twenty seven keys indicated by symbols "A" to "Z" and a symbol "—", and the preset keys 6-2 are used for inputting character data.

In FIG. 2, output signals of the scale portion 1 and the operating portion 6 are supplied to a CPU 10 via a bus 9. A printing portion 4 performs a thermal dot printing based on a print signal supplied thereto from the CPU 10. As a result, the characters, the symbols, bar codes and the like can be arbitrarily printed as being displayed on the display portion 5. The display portion 5 displays several symbols based on a display signal supplied from the CPU 10.

Figure 4:
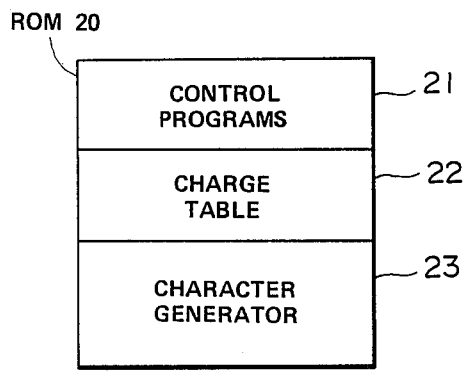
FIG. 4 is a drawing showing a constitution of a ROM 20 provided in the electronic postal scale.

As shown in FIG. 4, a ROM 20 memorizes several kinds of control programs 21, a charge table 22 and a character generator 23 therein. The control programs 21 including a scale control program, a charge calculating program, a program for setting preset data and other programs.

As shown in FIG. 5, the charge table 22 stores every kind of rates and services of the postal companies. The rates are stored in tables of table numbers #1 to #50, and the services are stored in tables of table numbers more than #51.

For example, FIG. 5(A) shows a content of the table number #15 which represents several rates within the rates of the UPS. In this table, vertical columns represent the weight and horizontal columns represent the destination zone. In vertical columns, the weight of the package is divided by one pound within a weight range between one pound and seventy pounds. In horizontal columns, the destination zone indicates seven kinds of zones indicated by second to eighth zones. The postal charge is determined by the weight and the zone. When the weight lies between forty eight pounds and forty nine pounds and the fourth zone is selected, the charge is determined to 9.53 dollars. Other rates and services are provided in the UPS and are stored in a ROM 20. In addition, the rates and services of the other postal companies are stored as well.

FIG. 5(B) shows a partial table of a service charge table. In this table, the table number #60 indicates that a COD service charge of the UPS is 1.90 dollars. And the table number #61 indicates that a AOD service charge of the UPS is 0.30 dollar.

Figure 6:
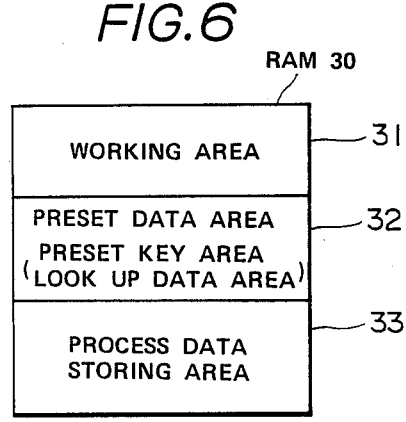
FIG. 6 is a drawing showing a constitution of a RAM 30 provided in the electronic postal scale.

Next, FIG. 6 shows a constitution of a RAM 30. The RAM 30 is constituted by a working area 31, a preset data area 32 and a process data (or transaction data) storing area 33. The working area 31 includes several kinds of registers, flags, printing buffers and the like.

Figure 7:
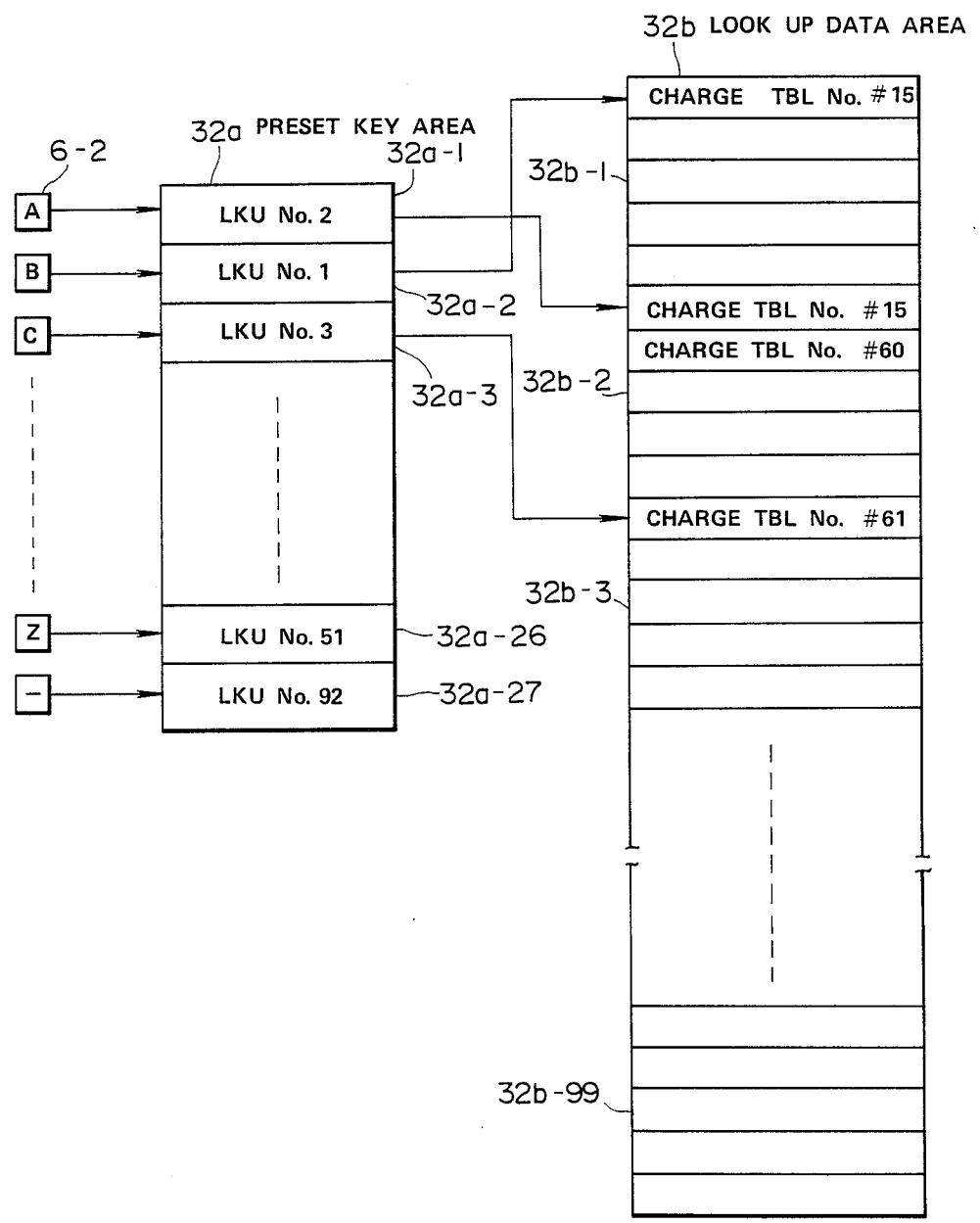
FIG. 7 is a drawing showing a constitution of a preset data area 32.

The preset data area 32 is constituted by a nonvolatile RAM and the constitution thereof is shown in FIG. 7.

In FIG. 7, a preset key area 32a has twenty seven areas 32a-1 to 32a-27 corresponding to twenty seven preset keys 6-2 shown in FIG. 3. Look up numbers (1 to 99) are set to the areas 32a-k (where k= 1 to 27) for retrieving a look up data area 32b. For example, a head area 32a-1 stores the look up number No. 2 corresponding to the "A" key within the preset keys 6-2, and a second area 32a-2 stores the look up number No. 1 corresponding to the "B" key.

The look up data area 32b has ninety nine areas 32b-1 to 32b-99 in correspondence with the look up number "1" to "99". Five table numbers within the charge table 22 can be stored in each area 32b-i (where i= 1 to 99). For example, the head area 32b-1 in the look up data area 32b stores the charge table number #15 therein and indicates the charge table #15 shown in FIG. 5(A). The second area 32b-2 stores the charge table number #15 and the charge table number #60 therein, and the second area 32b-2 indicates the charge table #15 shown in FIG. 5(A) and the charge table #60 shown in FIG. 5(B) as well. As described before, the charge table #15 indicates the rates and the charge table #60 indicates the service charges. Total five table numbers of rate and service charges can be set in each area 32b-i. More specifically, a maximum of one table number of rate can be set in each area 32b-i, and a maximum of five table numbers of service charges can be set in each area 32b-i. And, toal table numbers of rate and service charges which can be set in each area 32b-i are limited within five table numbers. In this case, it is nonsense to set more than two rates when calculating the charge, however, several additional services can be set.

The above description will be summarized into following three points.

(1) The look up number is selected corresponding to the twenty seven preset keys and is set in the preset key area 32a.

(2) The look up data area 32b having ninety nine areas therein is provided in correspondence with ninety nine look up numbers. Hence, certain relations are built between the look up numbers and the rates and services within the charge table 22. The total number of rates and services which can be set in each area within the ninety nine areas is limited to five, however, the number of rates is limited to one.

(3) The charge table 22 stores all rates and services therein which are to be used. The rates are stored in the table numbers #1 to #50. The services are stored in tables of the table numbers more than #51. The charge table can be changed by changing the ROM 20.

Next, description will be given with respect to a setting operation and a registration operation. The setting operation means an operation in which data are written into the preset data area 32, and the registration operation means an operation in which the postal charge of the package is calculated.

(A) SETTING OPERATION

This setting operation is started by inputting required data from the operating portion 6. In this case, the charge table number is first set to the look up data area 32b shown in FIG. 7 and the look up number is next set to the preset key area 32a. This setting operation is performed in an interactive operation by watching displayed messages on the message area 5-1.

(1) The mode switch 7 (which will be described later in conjunction with FIG. 12) provided on a side face of the body 2 of the electronic postal scale is set to a setting mode thereby.

(2) The message area 5-1 displays a message such as "DO YOU SET THE LOOK UP DATA?". An operator selects and depresses one of a YES key and a NO key in the flat keyboard 6-1.

(3) When the YES key is depressed, the message area 5-1 displays a message such as "PLEASE INPUT LOOK UP NUMBER". Then, the numerals "1" to "99" are inputted by use of a ten-key of the flat keyboard 6-1 and the ENTER key is depressed.

When the charge table number #15 is set to the head area 32b-1 of the look up data area 32b, the numeral "1" of the area 32b-1 is first selected and the ENTER key is next depressed.

(4) In this case, a message such as "LOOK UP NUMBER(1) PLEASE INPUT RATE OR SERVICE" is displayed. Hence, the charge table number of the rates or services is inputted and the ENTER key is depressed. Thus, the charge table number is written into a head portion of the look up data area 32b shown in FIG. 7. In the case where the charge table number #15 is set in the head area of the look up data area 32b, the value "15" is inputted and the ENTER key is depressed, for example. When the RATE#key is depressed at this time, the operation returns to above operation (3). Then the ESC key is depressed, and the operation returns to above operation (2).

(5) When the rate (or the service) is set in above operation (4), a message such as "LOOK UP NUMBER (1), PLEASE INPUT SERVICE" is displayed. Then the table number of the service is inputted and is set to the look up data area 32b as described above. As described before, one rate and four services or five services can be set in each area 32b-i within the look up data area 32b. The rate can be only set as a first input datum, and an instruction such as "PLEASE INPUT SERVICE" is displayed after inputting a second datum.

Thereafter, the above operation is repeated until the fifth datum is set. In this case, the operation returns to above operation (3) when the RATE#key is depressed, and the operation returns to above operation (2) when the ESC key is depressed.

In above operation, the data are written into the look up data area 32b when the ENTER key is depressed after the table number is inputted. However, it is possible to constitute so that the data are written into the area 32b when the RATE# key is depressed.

(6) When the charge table number is set in above operations (3) to (5), the ESC key is depressed. Thus, the operation returns to above operation (2).

(7) In a condition of above operation (6), a question such as "DO YOU SET PRESET KEY DATA? " is displayed when the NO key is depressed. When the answer to the above question is YES and the YES key is depressed, the operation moves to the operation (3). When the answer to the above question is NO and the No key is depressed, the operation jumps to a process for setting date data.

(8) Next, an instruction such as "AFTER INPUTTING LOOK UP NUMBER, PLEASE DEPRESS PRESET KEY" is displayed. In this case, when a certain number is selected within the look up numbers 1 to 9 by the ten-key and the predetermined preset key is depressed, the selected look up number is set in a predetermined area within the preset key area 32a.

As shown in FIG. 7, for instance, when the look up number "2" is to be set in the area 32a-1 corresponding to the A key, the "2" key and the "A" key must be sequentially depressed, (9) When above operation (8) is repeated and the look up numbers are completely set in the preset key area 32a, the ESC key is depressed and the operation returns to the operation (7). If the operator wants to complete the setting operation, the mode is changed to a registration mode by the mode switch. If the operator wants to set the date data, the NO key must be depressed.

(10) The setting operation is completed in above operation (9). In this setting mode, it is possible that the predetermined key is depressed to print out several reports such as a list indicating a relation between the look up number and a setting content of the rate/service, and a list indicating a relation between the preset key, the look up number and the setting content of the rate/service.

Incidentally, it is possible to constitute so that a menu of input data or an operation menu is displayed in the message area 5-1 by depressing a MENU key in the setting mode and the registration mode.

(B) REGISTRATION OPERATION

In the registration operation, the package is put on the scale portion 1 of the electronic postal scale so as to measure the weight of the package and the postal charge is calculated.

The registration operation mainly includes a first operation for depressing the preset keys 6-2 to select the rate and service and a second operation for calculating the postal charge based on the selected rate and service and the measured weight. When it is required that the destination must be set before calculating the postal charge, the destination must be inputted by use of the ten-key. In case of the U.S.A., the destination can be set by a zip code and a zone number as well. Since the zone number is in one figure and the zip code is in a plurality of figures, the input data can be read as the zip code when the input data has a plurality of figures. When the zip code is inputted, the zone number corresponding to the inputted zip code is selected from a conversion table stored in the ROM 20.

Figure 8:
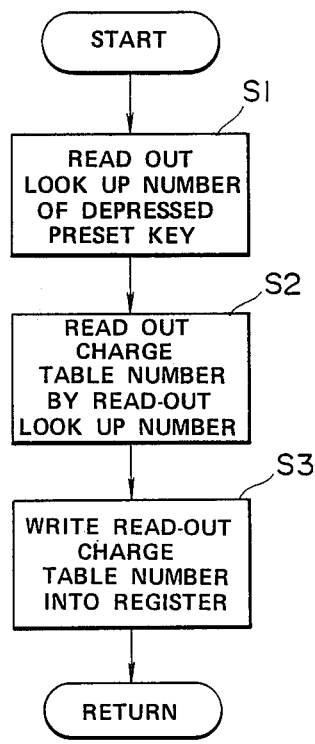
FIG. 8 is a flow chart for explaining a sequential operation for obtaining a charge table number by depressing the preset keys.

FIG. 8 is a flow chart showing a diagrammatic process when the preset keys 6-2 are depressed.

First, the look up number corresponding to the depressed key within the preset keys 6-2 is read from the preset key area 32a (in a step S1).

Next, the look up data area 32b is retrieved based on the read-out look up number and the corresponding charge table number is read out (in a step S2). This charge table number is written into a register within the working area 31 of the RAM 30 (in a step S3).

Figure 9:
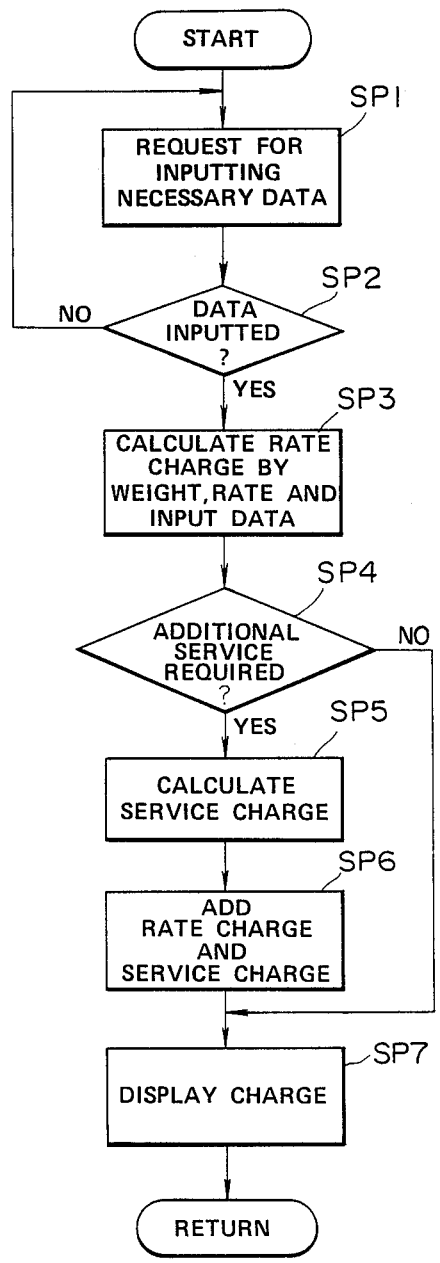
FIG. 9 is a flow chart for explaining a sequential operation of a calculation of the postal charge.

Thus, when the required charge table number is set in the register, the CPU 10 performs a control operation thereof shown in a step SP1 in FIG. 9 wherein required input data corresponding to the charge table number are selected from the data stored in the ROM 20 and are displayed in the message area 5-1. When the data are inputted (in a step SP2), the postal charge is determined based on weight data transferred from the scale portion 1, the rate selected by the table number and the required input data (in a step SP3). Where no data are inputted in step SP2, then step SP1 is repeated.

In addition, the CPU 10 checks whether there is any additional services or not (in a step SP4). If any additional services are required, the charge table is retrieved so as to read out the service charge (in a step SP5). This service charge is added to the rate charge calculated in the step SP3 to obtain an amount charge (in a step SP6). Finally, this amount charge is displayed (in a step SP7). If the check of step SP4 determines no additional services are required, then the charge is displayed immediately after step SP4.

Next, description will be given with respect to a practical registration operation by taking account of an example in which a package having a weight of 48 lb. and 15 oz. is mailed to the fourth zone within the charge table #15 shown in FIG. 5 (this table corresponds to the GROUND of the USP). In this case, the preset data area 32 is supposed to be set as shown in FIG. 7 and the package is supposed to accompany with the COD and the AOD as additional services.

(1) The mode is set to the registration mode by the mode switch 7 (which will be described later). Thus, an instruction such as "PLEASE SELECT RATE" is displayed in the message area 5-1.

(2) The package is put on the scale portion 1 so that a message such as "48.15" will be displayed in the weight display area 5-2. The weight of the package can be measured later.

(3) The operator depresses the preset key "A" so as to select the rate. The CPU 10 reads out the look up number No.2 corresponding to the preset key "A" from the preset key area 32a. And the CPU 10 reads out the charge table numbers #15 and #60 from the area 32b-2 within the look up data area 32b based on the look up number No.2. Then the charge table numbers #15 and #60 will be transferred to the register in the working area 31.

(4) The CPU 10 judges based on the data set in the ROM 20 that the table number #15 corresponds to the rates according to the GROUND of UPS and zone data must be required. At this time, an instruction such as "UPS GROUND, PLEASE INPUT ZONE" is displayed.

(5) The operator inputs the zone data "4" or the zip code by use of the ten-key and depresses the ENTER key. Thus, the CPU 10 reads out the rate charge of 9.53 dollars from a portion corresponding to the zone 4 (fourth zone) of the charge table #15 and the weight of 48.15. Since the charge table #60 is stored in the register, the CPU 10 retrieves the charge table #60 and reads out the COD service charge of 1.90 dollars. Above rate charge and service charge are added together to obtain an amount charge of 11.43 dollars. This amount charge is displayed in the charge display area 5-3 and the message area 5-1 displays an instruction such as "GRD Z4 COD, PLEASE INPUT PACKAGE NUMBER".

(6) The package number is inputted by use of the ten-key and the PIN-key (shown in FIG. 3).

(7) In above operation, the PRINT key is depressed so that the label can be printed and published. On the other hand, it is possible to further set another service in this case. For example, when the preset key "C" is depressed, the CPU 10 retrieves the area 32b-3 within the look up data area 32b based on the look up number No.3 so as to obtain the charge table number #61. The charge table number #61 is written into the register.

(8) The CPU 10 retrieves the table #61 written in the register( as shown in FIG. 5(B) ) and reads out the AOD service charge of 0.30 dollar. This service charge is added to the amount charge of 11.43 dollars to obtain the total charge of 11.73 dollars. This total charge will be displayed. Furthermore, a message such as "GRD Z4 COD AOD" will be displayed.

(9) When the PRINT key is depressed in a condition of above operation (8), a label is printed and published by each rate and each service.

FIG. 10 shows an example of the label 40. In FIG. 10, 41 indicates the rate, 42 indicates a publishing office, 43 indicates the package number, 44 indicates the published date, 45 indicates a serial number, 46 indicates the weight of the package, 47 indicates the destination zone, 48 indicates the rate charge and 49 indicates the total charge. In addition, 41a indicates the COD service, 41b indicates the AOD service, 48a indicates the COD service charge, 48b indicates the AOD service charge.

In the present embodiment, total five table numbers of rate and service charges can be assigned to one preset key. Hence, it is possible to reduce the number of times for depressing the preset keys when selecting the rate and service.

Figure 21:
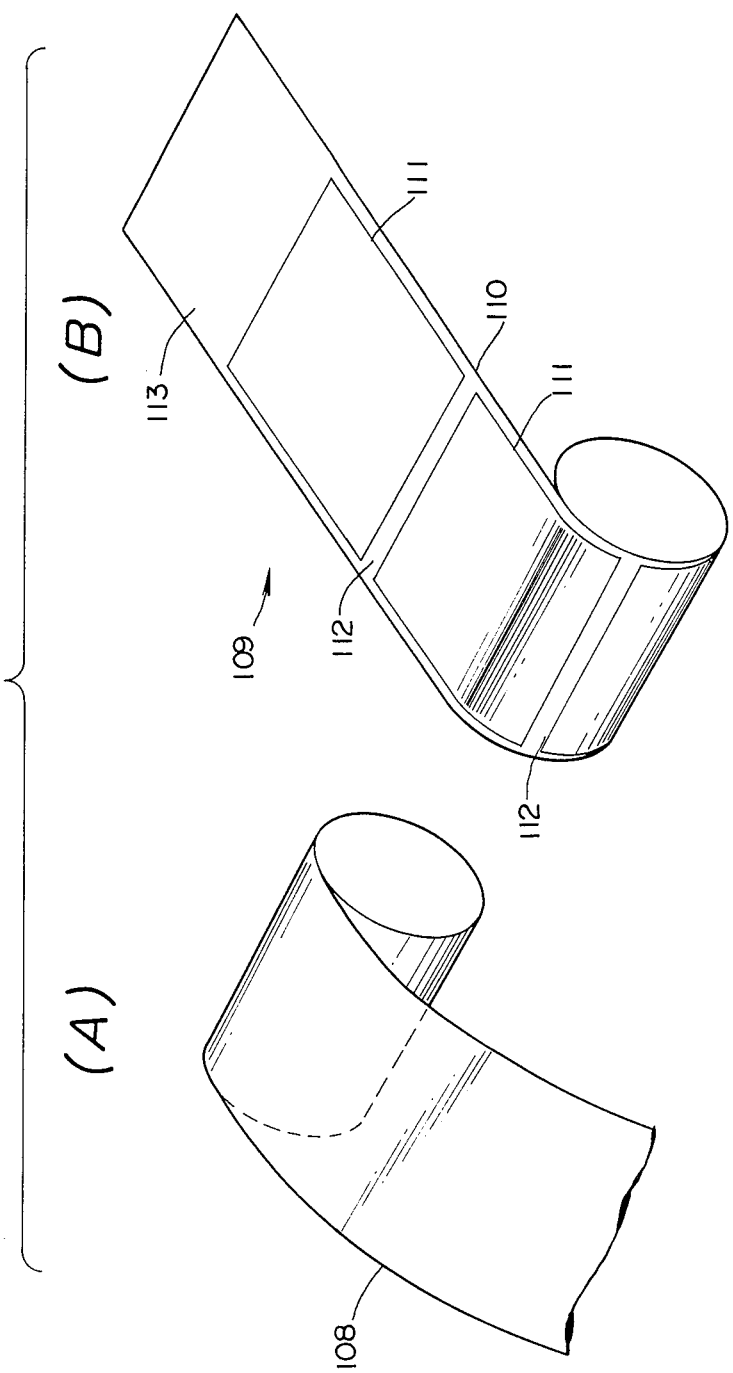
FIG. 21(A) is a perspective view of the receipt sheet and FIG. 21(B) is a perspective view of the label sheet.

Next, description will be given with respect to the printing portion 4 in detail. Hereinafter, the printing portion 4 will be referred to as a sheet cassette 4 which includes a first cassette 4a containing a label sheet therein and a second cassette 4b containing a receipt sheet therein. FIG. 21(A) shows an example of a rolled receipt sheet 108 contained in the second cassette 4b. A thermosensitive paper having a predetermined width thereof is rolled to obtain the receipt sheet 108. FIG. 21 (B) shows an illustration near an end edge of the label sheet 109 contained in the first cassette 4a. A plurality of thermosensitive labels 111 are adhered on a mount 110 in series to obtain the label sheet 109. A detecting slit 112 having a width of 2 mm is formed between the two adjacent labels 111. An end portion 113 in which no labels are adhered is formed after the final label 111. The detecting slits 112 are provided because positions of the labels 111 are required to be confirmed when printing the labels 111. In this detection operation, the label sheet 109 is transferred between a light emitting element and a light accepting element of a transparent photoelectric sensor so as to obtain an output signal. The position of the labels can be detected based on a deviation of this output signal.

Figure 13:
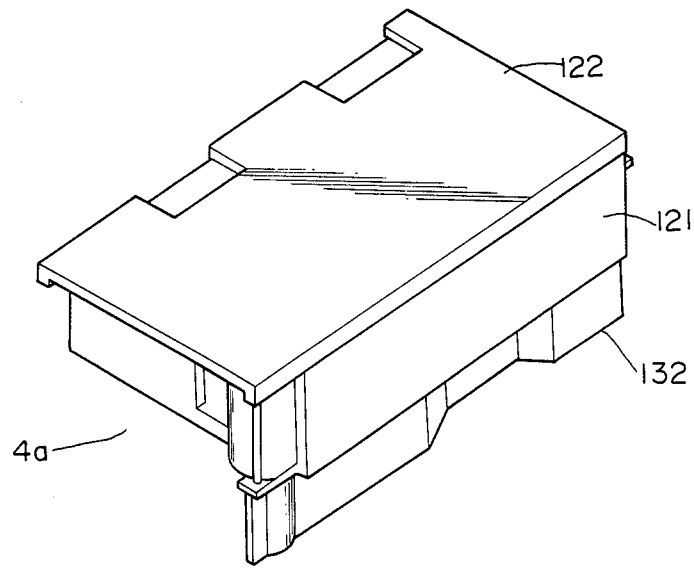
FIG. 13 is a perspective side view of a first cassette for labels.
Figure 14:
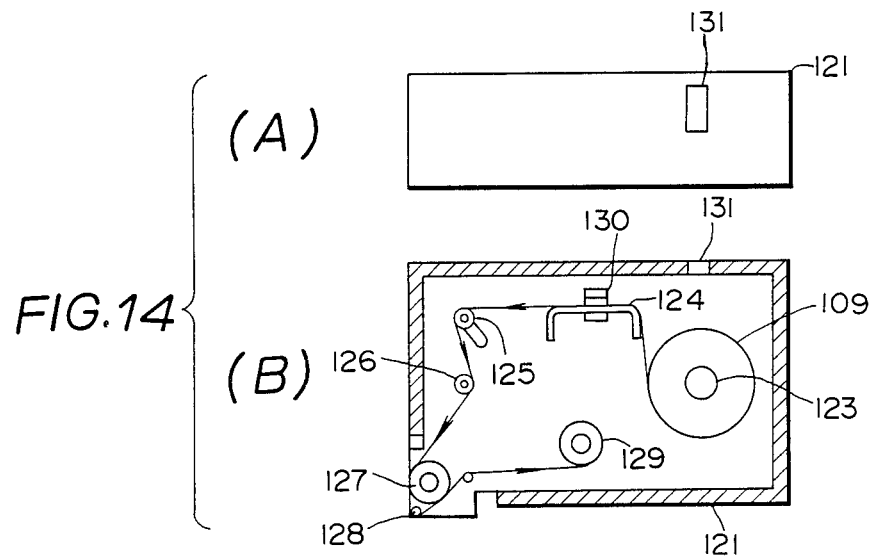
FIG. 14(A) is a rear view of the first cassette and FIG. 14(B) is a sectional view showing an internal constitution of the first cassette.

FIG. 13 is a perspective view showing a constitution of the first cassette 4a. FIG. 14(A) is a rear view of the first cassette 4a, and FIG. 14(B) is a view showing an internal constitution of the first cassette 4a. The first cassette 4a is constituted so that the label sheet 109 is contained in a flat box 121. A lid 122 of the box 121 can be lifted and the label sheet 109 can be stowed therein. The label sheet 109 is located around a rotary shaft 123. The label sheet 109 is passed through an approximately U-shaped guide plate 124 and idle rollers 125, 126, and the label sheet 109 is reached to a platen roller 127 and a dispenser 128 wherein the labels 111 are separated from the mount 110. The separated labels 111 are discharged outside and the separated mount 110 is taken up by a take-up reel 129. A prism attaching portion (which will be described later) is formed below the guide plate 124, and a prism 130 is attached in the prism attaching portion. In addition, an opening portion 131 indicating that the cassette 4a is used for printing labels is formed in a rear side of the cassette 4a. And the protection plate 132 is provided below a front surface of the cassette 4a.

Figure 15:
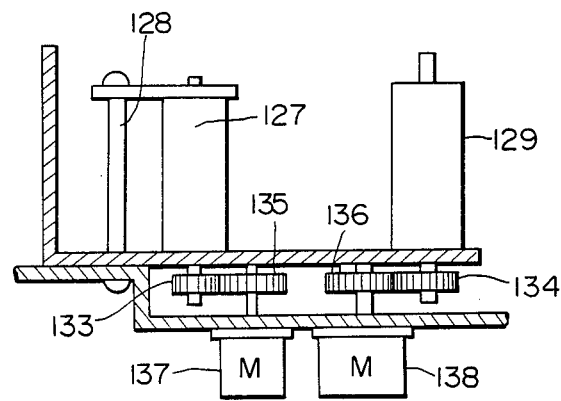
FIG. 15 is a diagram showing a relationship between the first cassette and a drive mechanism provided in the body of the electronic postal scale.

As shown in FIG. 15, a gear 133 toothed to the shaft of the platen roller 127 and a gear 134 toothed to the shaft of the take-up reel 129 are provided outside an under surface of the cassette 4a. When the cassette 4a is attached to the cassette attaching portion 3 of the body 2, these gears 133 and 134 are respectively toothed to drive gears 135 and 136 provided in the body so that the platen roller 127 and the take-up reel 129 are driven to revolve. In this case, the drive gear 135 is driven by a pulse motor 137 so that the platen roller 137 is driven at a constant speed. On the other hand, the drive gear 136 is driven by a DC motor 138 for taking up the mount so as to revolve the take-up reel 129.

Figure 16:
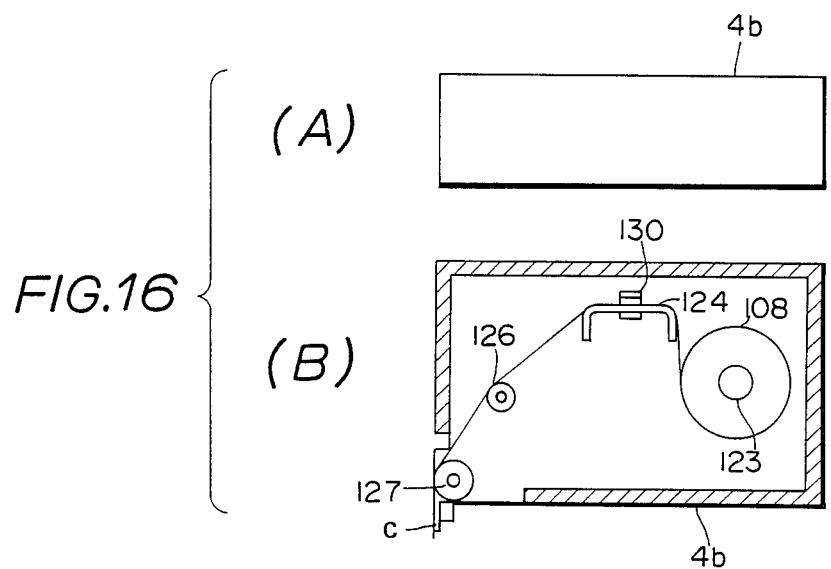
FIG. 16(A) is a rear view of a second cassette for a receipt sheet and FIG. 16(B) is a sectional view showing an internal constitution of the second cassette.

FIG. 16 shows an example of a constitution of the cassette 4b for the receipt sheet. This cassette 4b differs from the cassette 4a in that there are not provided the opening portion 131, the idle roller 125, the dispenser 128 and the take-up reel 129 but there is provided a cutter C. No opening portion 131 means that the cassette 4b is used for printing the receipt sheet. In the cassette 4b, the printed receipt sheet is discharged outside just after being printed, hence, it is unnecessary to separate the labels 111 from the mount 110 and to take up the mount 110 as well. Therefore, the dispenser 128 and the take-up reel 129 are not provided. As a result, the receipt sheet 108 attached to the rotary shaft 123 is passed through the guide plate 124, the idle roller 126 and the platen roller 127 and is discharged outside. As described in the cassette 4a, the cassette 4b is driven to revolve so that the receipt sheet 108 is drawn out. The cutter C is used for cutting the printed receipt sheet with fingers.

Figure 17:
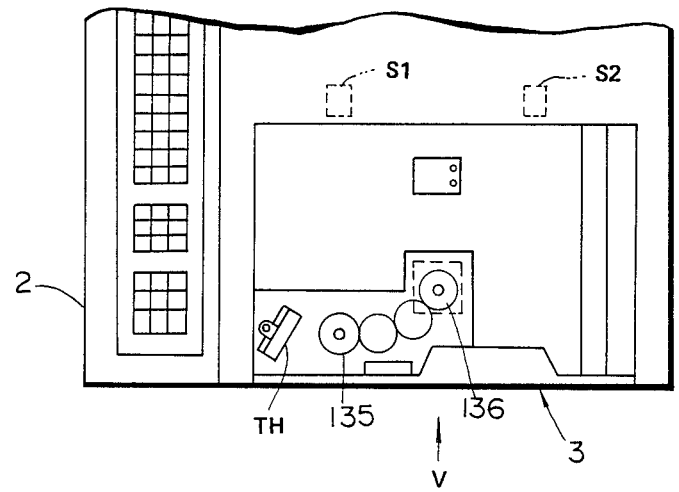
FIG. 17 is a partially cutaway plan view showing a constitution of the cassette attaching portion.
Figure 18:
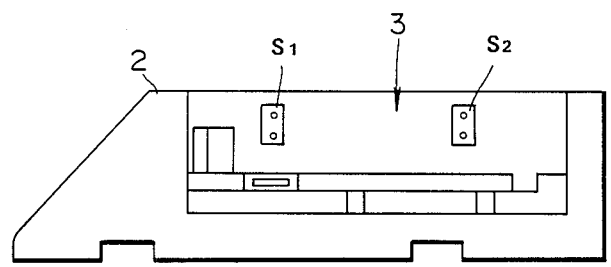
FIG. 18 is a view in the direction of the arrow V in FIG. 17.
Figure 19:
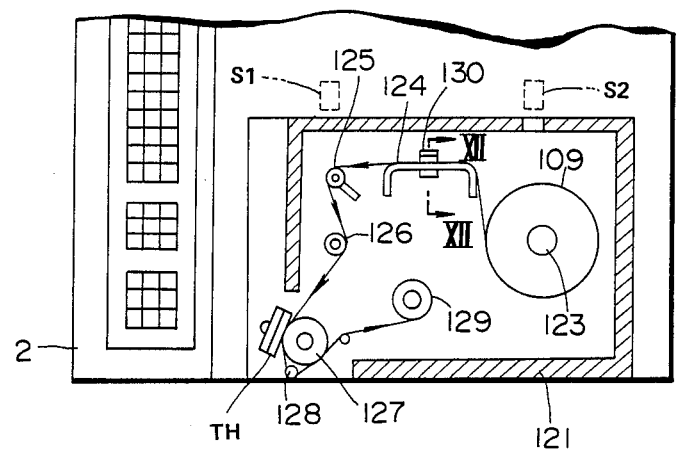
FIG. 19 is a sectional plan view showing a situation in which the first cassette is attached to the body of the electronic postal scale.

FIG. 17 and FIG. 18 both show the cassette attaching portion 3 in the body 2, and FIG. 19 is a plan sectional view showing a condition in that the cassette 4a is attached to the cassette attaching portion 3. In FIGS. 17 to 19, TH indicates a thermal head which pushes the receipt sheet 108 and the label sheet 109 to the platen roller 127 and performs thermal printing. In the case where the labels 111 are printed, the printed labels 111 are separated from the mount 110 by the dispenser 128 and are discharged outside. S1 and S2 indicate reflective photoelectric sensors which are used for detecting whether the cassette is attached or not and for discriminating whether the cassette 4a or the cassette 4b is attached. In the case where the cassette 4a is attached, the photoelectric sensor S1 is exposed to the reflected light and is turned on, however, a light beam emitted from the photoelectric sensor S2 is passed through the opening portion 131 and is not reflected by the outside surface of the cassette 4a so that the photoelectric sensor S2 is turned off. On the other hand, the cassette 4b does not have the opening portion 131, hence, the photoelectric sensors S1 and S2 are both turned on.

Figure 20:
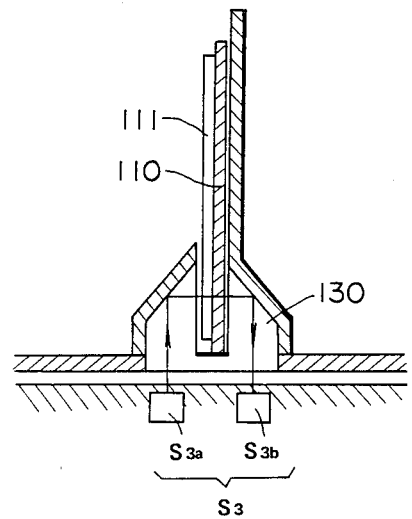
FIG. 20 is an enlarged sectional view taken along the line XII—XII in FIG. 19.

FIG. 20 is a sectional view taken along line XII-XII in FIG. 19, and FIG. 20 shows a constitution of the prism 130. A photoelectric sensor S3 is mounted in the body 2 and a light emitting element S3a thereof emits the light to the prism 130 wherein the light is reflected and refracted as an approximately U-shape refraction. The reflected and refracted light is transmitted through the label sheet 109 or the receipt sheet 108. The transmitted light is refracted by the prism 130 again and is reached to a light accepting element S3b of the photoelectric sensor S3. Thus, the light accepting element S3b is exposed to the transmitted and refracted light which has an intensity corresponding to a thickness and a transmission factor of the sheet passing through the guide plate 124.

Figure 12:
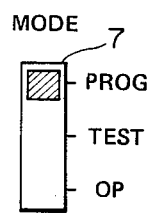
FIG. 12 is a front view of a mode switch.

As shown in FIG. 12, the mode switch 7 is provided for selecting one of three predetermined modes including a setting mode (PROG MODE), a registration mode (OP MODE) and a test mode (TEST MODE). In the setting mode, several kinds of data are inputted by the operating portion 6 and are stored in a preset data area in a RAM 143 which will be described later. In the registration mode, the package is put on the electronic postal scale, the weight thereof is measured and the postal charge thereof is calculated. In the test mode, the operator can practice and confirm the operation of the electronic postal scale.

Next, description will be given with respect to a second embodiment of the present invention in conjunction with FIG. 11.

Figure 11:
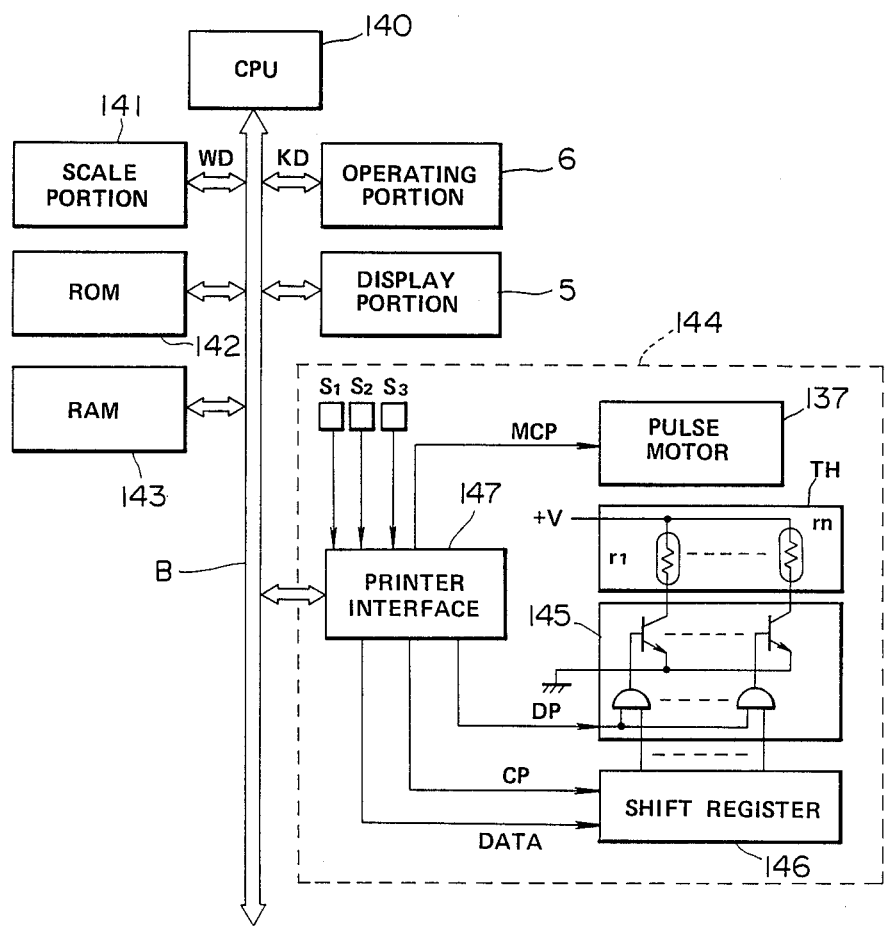
FIG. 11 is a block diagram showing an electric constitution of a second embodiment of the invention.

In FIG. 11, 140 indicates a CPU (Central Processing Unit), and 141 indicates a scale portion. The scale portion 141 comprises of a scale pan 1 shown in FIG. 1, a load cell provided below the scale pan 1 and an A/D converter in which an output signal of the load cell is converted into digital data and this digital data are outputted to a bus line B (shown in FIG. 11) as a weight data WD. The operating portion 6 outputs key data KD corresponding to the depressed key to a bus line B. Display data from the CPU 140 is supplied to a drive circuit of the display portion 5.

A ROM 142 stores a program for printing the labels, a program for printing transaction data, a program for printing preset data, several kinds of character (including numeral and symbol) patterns (dot patterns), charge tables, control programs and other programs therein. The stored character patterns include several kinds of relatively large character patterns mainly used for printing labels and several kinds of relatively small character patterns mainly used for printing the receipt sheet. A character code is assigned to each character pattern, and the character pattern is read out based on the character code. In the charge table, the rates and services of each postal company are stored. For instance, vertical columns of the rate storing table indicate the weights of the package, and horizontal rows thereof indicate the zones classified by the destinations (destination zones). Hence, the charge can be determined by the weight of the package and the zone thereof. On the other hand, service charges of each postal company are stored in the service charge storing table in correspondence with the selected table number.

Next, a RAM 143 shown in FIG. 11 is constituted by (1) a printing buffer area, (2) a preset data area, (3) a transaction area and (4) a working area.

The character patterns for being printed on the labels or the receipt sheet are written into the printing buffer area (1) which has a memory storage corresponding to a maximum printing block of the label. The preset data area (2) includes the pre-mentioned preset key area and look up data area. The transaction area (3) stores the following ten kinds of data having predetermined word length and concerning one hundred and fifty items of the latest process data (a sequential file).

(a) number (serial number:1–150)
(b) table number of rate (rate of "USP GROUND", for example)
(c) PIN (ID number of package)
(d) DPT (dispatching office)
(e) ZONE (dispatching zone)
(f) price
(g) weight
(h) whether COD service is required or not
(i) whether AOD service is required or not
(j) whether DV (insurance) is required or not, if DV is required, insurance money and insurance premium Next, 144 in FIG. 11 indicates a printer portion which comprises of a pulse motor 137 for driving the sheet, a drive circuit 145 for driving thermal head TH including heating resistors $r_1$ to $r_n$ of one hundred and twenty eight dots, a shift register 146 for writing a dot pattern of one line, prementioned photoelectric sensors S1, S2 and S3, and a printer interface 147. The printer interface 147 outputs a drive pulse MCP for driving the pulse motor, a print pulse DP for the drive circuit 145, a shift pulse CP for the shift register 146 and serial dot data DATA respectively based on the control data supplied from the CPU 140.

The operations of the present embodiment can be diagrammatically classified into a setting operation, a registration operation, a test operation and a print operation for printing the receipt sheet. In the setting operation, the data are written into the preset data area. In the registration operation, the charge of the package is calculated, and the calculated charge is printed on the label, and furthermore, the data printed on the label are stored in the transaction area. The test operation means an operation for practicing and confirming the operation, and the test operation also includes a test label printing operation for performing a label printing as a test. In the print operation for printing the receipt sheet, the transaction data and the preset data can be printed. This print operation can be classified into two kinds of modes such as a report mode (in which the transaction data are printed) and a list mode (in which the charge table data and the preset data are printed) based on the printed contents. The above modes can be changed by selecting one of three positions of the mode switch 7 and by using one of two cassettes 4a and 4b. Hence, six kinds of combination can be provided.

Before describing respective operation, description will be given with respect to the switching operations (in conjunction with FIG. 22 and FIG. 23).

Figure 22:
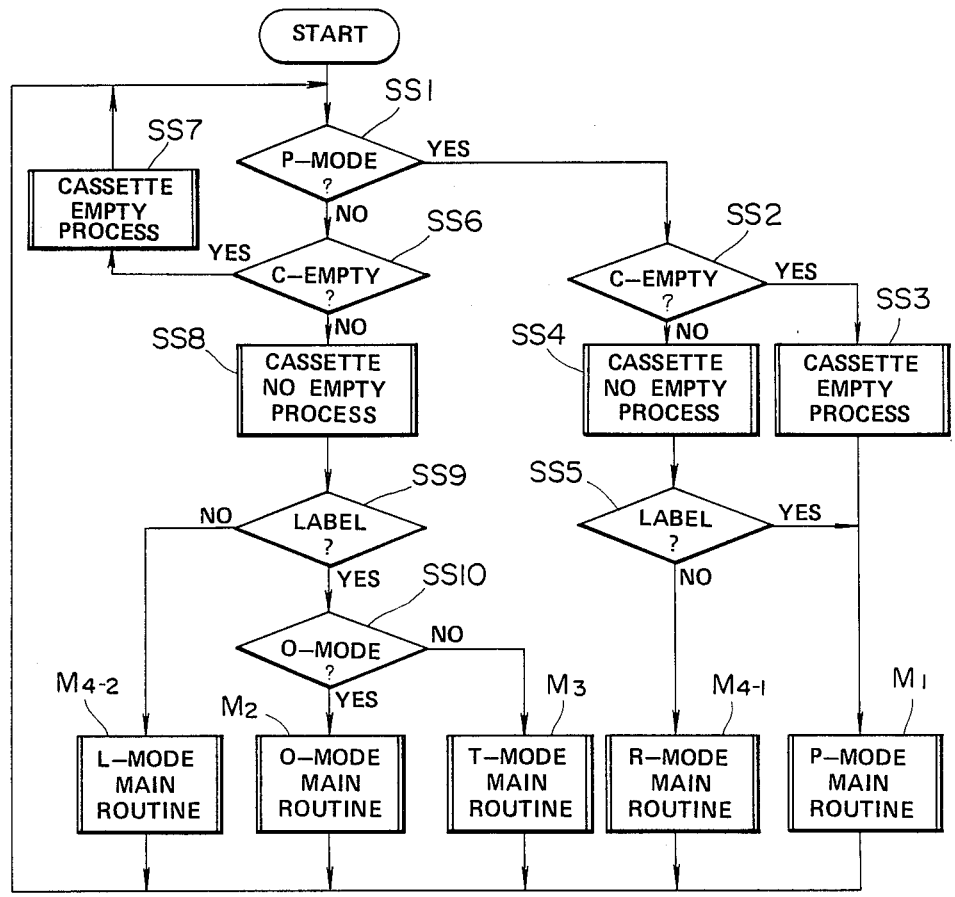
FIG. 22 is a flow chart for explaining a switching operation of the electronic postal scale.

(1) A power switch is turned on and an initial process of the electronic postal scale is completed, and thereafter, the program shown in FIG. 22 is started.

(2) First, the CPU 140 checks whether the mode switch 7 is set to a program mode (PROG) or not (in a step SS1).

(3) When the mode switch 7 is set to PROG, the CPU 140 checks whether any cassette is attached to the cassette attaching portion 3 or not (in a step S52). This check operation is performed based on a detection signal of the sensor S1.

When the cassette is not attached, the CPU 140 performs an empty process for setting a cassette empty flag (in a step SS3) and the present operation advances to a program mode (PMODE) main routine M1. The prementioned setting operation is performed by the main routine M1.

(4) When the cassette is attached, the CPU 140 resets the cassette empty flag (in a step SS4) and checks whether the cassette 4a is attached or not (in a step SS5). This check operation is performed by a detection signal of the sensor S2.

(5) When the cassette 4a is attached, the present operation will advance to the main routine M1. When the cassette 4b is attached, the present operation will advance to a report mode (R-MODE) main routine M4-1. This main routine M4-1 is identical to one of pre-mentioned printing operations for printing the receipt sheet.

(6) On the other hand, when the mode switch 7 is not set to the PROG, the CPU 140 checks whether any cassette is attached to the cassette attaching portion 3 or not in a step SS6. As described in the step SS2, the above check operation is performed based on the detection signal of the sensor S1.

When the cassette is not attached, the cassette empty message is displayed in the message area 5-1 in the display portion 5, and the CPU 140 performs the empty process (in a step SS7) for setting the cassette empty flag, and thereafter, the present operation will be back to the step SS1.

(7) When the cassette is attached, the cassette empty flag is reset and the cassette empty message is disappeared (in a step SS8). Thereafter, the CPU 140 checks whether the cassette 4a is attached or not (in a step SS9). As described in the step SS5, this check operation is performed by the detection signal of the sensor S2.

(8) When the cassette 4a is attached, the CPU 140 further checks in a step SS10 whether the mode switch 7 is set to the operation mode (OP) or not. When the mode switch 7 is set to the OP, the present operation will advance to an operation mode (O-MODE) main routine M2. When the mode switch 7 is set to a test mode (T-MODE), the present operation will advance to a test mode (T-MODE) main routine M3.

The O-MODE main routine M2 is provided for the prementioned registration operation, and the T-MODE main routine M3 is provided for the pre-mentioned test mode.

(9) When the CPU 140 finds that the cassette 4b is set in the step SS9, the present operation will advance to a list mode (L-MODE) main routine M4-2. This main routine M4-2 is identical to one of the printing operations for printing the receipt sheet.

Figure 23:
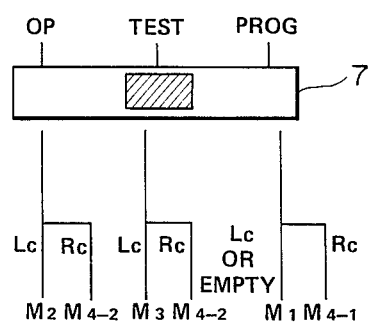
FIG. 23 is a drawing showing a mode operation of the electronic postal scale in response to the mode switch and the first or second cassette.

The above-mentioned relations between modes are summarized to show in FIG. 23. In FIG. 23, LC indicates the cassette 4a, RC indicates the cassette 4b and EMPTY means that any cassette is not attached. It is apparent from FIG. 23 that six kinds of mode combinations are made by selecting one of three positions of the mode switch 7 and by attaching one of two cassettes 4a and 4b. And one of the five kinds of main routines M1, M2, M3, M4-1 and M4-2 is selected based on the six kinds of mode combinations.

Next, description will be given with respect to respective operations performed by above main routines.

(A) SETTING OPERATION

This setting operation is performed when the required data are inputted in the P-MODE main routine M1 by use of the operating portion 6. In this case, the table numbers respectively indicating the rate and the service in the ROM 142 are set in the look up data area within the preset data area of the RAM 143. Thereafter, the look up number of the look up data area is set to the preset key area of the preset data area. This setting operation is performed in the interactive operation by watching the message displayed in the message area 5-1.

The procedure of this setting operation is approximately the same to that of the first embodiment, and the description thereof will be omitted.

(B) REGISTRATION OPERATION

In this registration operation, the package is put on the scale pan 1 shown in FIG. 1 and the charge thereof is calculated in the 0-MODE main routine M3. Furthermore, the calculated charge is printed on the label.

This registration operation can be summarized into the following six points (1) to (6).

(1) The package is put on the scale pan 1 so that the scale portion 141 measures the weight of the package and the weight thereof is displayed in the weight display area 5-2. In this case, the weight of the package is measured first, however, it is possible to measure the weight of the package later.

(2) In order to read out the charge data corresponding to the package, the preset keys 6-2 are depressed first and the look up number is read out corresponding to the depressed preset keys 6-2. Then, the look up data area corresponding to the selected look up number is retrieved so that the table numbers of the rate and the service charge are read out. The tables indicated by the table numbers is transferred to the register within the working area of the RAM 143.

(3) The CPU 140 calculates the charge by use of the transferred tables of the rate and service charge. In this case, the CPU 140 requests the zone indicating the destination of the package and the CPU 140 retrieves the table of the rate according to the zone and the weight so as to obtain the rate charge. The rate charge is added with the service charge read from the service charge table so as to obtain the total charge. This total charge is displayed in the charge display area 5-3, and the CPU 140 requests the operator to input the package number.

(4) After the operator inputs the package number, the print key "PRINT" is depressed so that the label printing operation will be started. The data within the working area are stored in the transaction area of the RAM 143.

(5) In the label printing operation, the information of the working area of the RAM 143 is first read out according to the program for printing the label stored in the ROM 142. This information is converted into character patterns by use of character patterns stored in the ROM 142. The character patterns are written into a printing buffer area within the RAM 143 in locations identical to character locations for printing labels.

(6) The contents of the printing buffer area are successively outputted to the printer portion 144. Thus, the labels are printed in the printer portion 144.

Hereinafter, description will be given with respect to the operation of the printer portion 144 in conjunction with FIG. 24(A).

(1) First, developed data of one line are set in the printing buffer and are printed (in a step SS11).

(2) After the one line is printed, the CPU 140 checks whether one label is completely printed or not (in a step SS 12). Since the printing scale of the label has been already set, the CPU 140 checks whether the printing area is completely printed or not.

(3) In the middle of printing of one label, the label is fed by one line and the line number is renewed (in a step SS13), and the present operation will be back to the operation in the step SS11.

(4) When the one label is completely printed, the present operation will advance from the step SS12 to the step SS14. In the step SS14, the label is fed by one line and the CPU 140 checks whether the photoelectric sensor S3 detects the slit (the label cap) 112 (shown in FIG. 21(B)) of the label sheet 109 or not (in a step SS15).

(5) When the slit 112 is not detected, the present operation will be back to the step SS14 wherein the label is further fed by one line.

(6) Thereafter, when the slit 112 is detected, the label printing is completed.

Thus, one label is completely printed based on the detection signal of the photoelectric sensor S3.

FIG. 25(A) shows an example of the printed label. In FIG. 25(A), 51 indicates the rate, 52 indicates the publishing office, 53 indicates the package number, 54 indicates the label publishing date, 55 indicates the weight of the package, 56 indicates the zone and 57 indicates the postal charge.

(C) TEST OPERATION

In the test operation, the charge is calculated and the calculated charge is printed on the label as a test in the test mode (T-MODE) main routine M4.

The test printing differs from the setting operation in that a character "TEST" 58 is printed on the label and the data are not stored in the transaction area of the RAM 143, however, other operations performed in the test printing is identical to that in the setting operation. The test printing is indicated by lighting the display lamp "TEST" in the display area 5-4. FIG. 25(B) shows an example of printed label in the test printing.

(D) PRINTING OPERATION FOR RECEIPT SHEET

As described before, the printing operation for the receipt sheet is performed by the main routines M4-1 and M4-2 shown in FIG. 22. The printed contents differ depended on respective main routines. Hence, description will be given with respect to respective main routines.

[D-1]

"Printing operation in the main routine M4-1"

In this case, the report mode (R-MODE) is selected and the content stored in the transaction area of the RAM 143 is printed on the receipt sheet. In the R-MODE, the display portion 5 displays a message such as "report mode".

In the R-MODE, data stored in the transaction area can be printed as several kinds of reports. The reports include following data or reports.

(a) all data of one hundred and fifty items within the transaction area (b) COD report only (c) DV report only (d) AIR (Airmail) report only (e) other reports The report number is provided to each kind of the reports. After this report number is inputted, the print key "PRINT" is depressed so that the printing operation for the receipt sheet is performed. At printing, the display portion 5 displays the name of the report.

Next, description will be given with respect to the operation of the printer portion 144 in the report mode by accompanying with FIG. 24(B).

Figure 24:
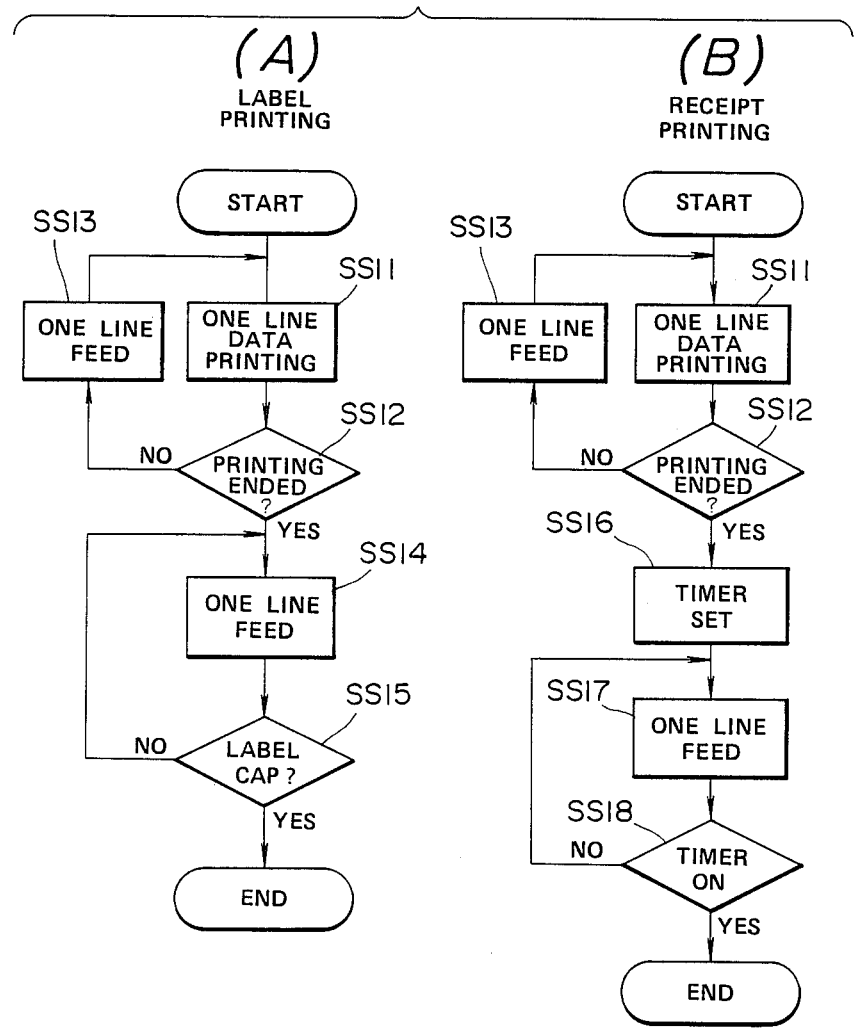
FIG. 24(A) is a flow chart for explaining a printing operation of labels and FIG. 24(B) is a flow chart for explaining another printing operation of the receipt sheet.

(1) In FIG. 24(B), the operations of the steps SS11 to SS13 are roughly identical to those in FIG. 24(A). In this case, the quantity of print data for the label is predetermined, however, the quantity of print data for the receipt sheet is not limited. Hence, when the quantity of print data is larger than the buffer storage in the report mode, the print data next to first print data is written in a print buffer and is printed after the first print data is printed on the receipt sheet.

(2) When the predetermined printing is completed, present operation will advance from the step SS12 to the step SS16 wherein a timer is set and the receipt sheet is fed by one line (in a step SS17).

(3) The CPU 140 checks whether the timer is up and is turned on or not (in a step SS18). When the timer is not turned on, the present operation will be back to the step SS17. When the timer is turned on, the receipt printing is completed.

Thus, the receipt printing is ended by feeding the receipt sheet in a predetermined time for providing a space having a predetermined length.

FIG. 26(A) shows an example of printed receipt sheet in the report mode. In FIG. 26(A), item numbers "29" to "35" within one hundred and fifty items are shown.

[D-2]

"Printing operation in the main routine M4-2"

In this case, the list mode (L-MODE) is selected, the rate and the charge table of the ROM 142 and the content of the preset data area of the RAM 143 are printed on the receipt sheet. And the display portion 5 displays a message such as "list mode".

In this mode, lists can be printed in several modifications. The printed lists include the following lists.

(a) a list of the kinds of the stored rates and services (b) a list of the rates stored in the look up data area (c) a list of the look up numbers corresponding to the alphabet preset keys 6-2

(d) a list of the preset keys 6-2 corresponding to the look up numbers

In above lists, each list has a list number. After the list number is inputted, the print key "PRINT" is depressed so that the receipt sheet printing is performed. When printing, the display portion 5 displays the name of the list.

In the list mode, the operation of the printer portion 144 is identical to that of the report printing (as shown in FIG. 24(B) ).

FIG. 26(B) shows an example of printed receipt sheet in the list mode. Shown is a list of stored kinds of the rates and services, in other words, FIG. 26(B) shows table numbers "01" to "12" within the stored table numbers (RESOURCE).

Above is the whole description of the preferred embodiments of the present invention. However, the present invention may be practiced or embodied in still other ways without departing from the spirit or essential character thereof. For instance, the test mode can be canceled, and the displayed messages and the arrangement of keys are not limited to above description. The preferred embodiments described herein are therefore illustrative and not restrictive, the scope of the invention being indicated by the appended claims and all variations which come within the meaning of the claims are intended to be embraced therein.

What is claimed is:

1. An electronic postal scale for computing a postal charge comprising:
   (a) scale means for measuring a weight of a package;
   (b) operating means including a plurality of keys including preset keys therein, for inputting a plurality of data concerning said postal charge and for inputting command signals, said preset keys having assigned corresponding look up numbers, said operating means being operatively connected to said scale means;
   (c) first memory means for storing data representative of charge information concerning said postal charge, operatively connected to said operating means to provide the data stored therein when requested;
   (d) second memory means for storing data representative of relations between said look up numbers and said charge information, operatively connected to said operating means to provide the data stored therein when requested;
   (e) third memory means for storing data representative of relations between said look up numbers and said preset keys, operatively connected to said operating means to provide the data stored therein when requested; and
   (f) control means operatively associated with at least said second and third memory means including reloading means therein, said reloading means for reloading contents of data stored in said second and third memory means in accordance with an operation of said operating means, said control means also for reading out desirable charge information assigned to depressed preset keys based on said memory contents of data stored in said second and third memory means, said postal charge of the package being calculated based on said weight of the package and said desirable charge information.

2. An electronic postal scale according to claim 1, wherein said charge information includes a plurality of data indicating a postal rate and a postal service.

3. An electronic postal scale according to claim 1 further including calculating means responsive to at least said scale and said operating means for calculating a rate charge depending on said weight of the package and said destination of the package, and for determining a service charge from the data inputted by said operating means, said calculating means adding said service charge and said rate charge together so as to obtain a total postal charge.

4. An electronic postal scale according to claim 1 further including a mode switch for selecting one or another of a setting mode and a registration mode so that said preset data concerning said postal charge is determined in said setting mode by use of said operating means, and said postal charge of the package is calculated in said registration mode.

5. An electronic postal scale according to claim 1 further including display means, said display means displaying at least said postal charge and said weight of the package.

6. An electronic postal scale according to claim 1, wherein said second memory means stores a plurality of charge information in accordance with one look up number.

7. An electronic postal scale according to claim 6, wherein a maximum of one postal rate is included in said plurality of charge information.

8. An electronic postal scale according to claim 7, wherein a maximum of five postal services are included in said plurality of data when no postal rate is included in said plurality of data, and a maximum of four postal services are included in said plurality of data when one postal rate is included in said plurality of data.

9. An electronic postal scale according to claim 1 further including printing means, said printing means printing at least the calculated postal charge on a predetermined sheet.

10. An electronic postal scale according to claim 9, wherein said printing means further comprises a cassette attaching portion and at least one cassette, said cassette attaching portion providing a cassette printer, said cassette providing a predetermined sheet therein, and said cassette being attached to said cassette attaching portion wherein at least said calculated postal charge is printed on said predetermined sheet.

11. An electronic postal scale according to claim 10, wherein said cassette printer comprises a thermal head, and said predetermined sheet being made of a thermosensitive paper.

12. An electronic postal scale according to claim 10 further including first and second cassettes, said first cassette providing a label sheet therein, and said second cassette providing a receipt sheet therein.

13. An electronic postal scale according to claim 11 further including print control means for storing and outputting print data, said print control means outputting at least said postal charge of the package to said cassette printer as said print data for said label sheet and storing said print data when said first cassette is attached, and said print control means outputting data stored therein to said cassette printer as said print data for said receipt sheet when said second cassette is attached.

14. An electronic postal scale according to claim 13, wherein a mark is provided to said first or second cassette and said cassette attaching portion further including a discrimination means, said discrimination means discriminating which cassette is attached to said cassette attaching portion by recognizing said mark, said print control means selecting one of a first print mode for said label sheet and a second print mode for said receipt sheet based on a discrimination result obtained from said discrimination means.

15. An electronic postal scale according to claim 13, wherein said print control means outputs preset data other than said print data to said cassette printer as new print data for said receipt sheet.

16. An electronic postal scale according to claim 14, wherein said mark is constituted by a slit formed in a predetermined portion of a casing of one of said first and second cassettes and said discrimination means is constituted by photoelectric elements including at least a light emitting element and a light accepting element, light emitted from said light emitting element being reflected by an outer surface of said casing of a cassette without said slit and being accepted by said light accepting element when said cassette without said slit is attached so that said light accepting element generates an output signal, said light passing through said slit when a cassette with said slit is attached so that said light accepting element is not exposed to said light whereby said light accepting element does not generate said output signal, and said discrimination means discriminating which cassette being attached based on said output signal of said light accepting element.

* * * * *

UNITED STATES PATENT AND TRADEMARK OFFICE
CERTIFICATE OF CORRECTION

PATENT NO. : 4,872,119
DATED : October 3, 1989
INVENTOR(S) : Hironobu Kajimoto

It is certified that error appears in the above—identified patent and that said Letters Patent is hereby corrected as shown below:

In column 13, line 43, change "S52" to -- SS2 --.

Signed and Sealed this

Eighteenth Day of September, 1990

Attest:

HARRY F. MANBECK, JR.

Attesting Officer          Commissioner of Patents and Trademarks